United States Patent
Hsu et al.

(10) Patent No.: US 7,017,233 B2
(45) Date of Patent: Mar. 28, 2006

(54) HINGE ASSEMBLY WITH INTEGRATING SHAFT

(75) Inventors: Sheng-Cheng Hsu, Tu-Cheng (TW); Shi-Hua Tian, Shenzhen (CN); Xiang-Dong Chen, Shenzhen (CN)

(73) Assignee: Hon Hai Precision Industry Co., Ltd., (TW)

( * ) Notice: Subject to any disclaimer, the term of this patent is extended or adjusted under 35 U.S.C. 154(b) by 0 days.

(21) Appl. No.: 10/891,739

(22) Filed: Jul. 15, 2004

(65) Prior Publication Data

US 2005/0055805 A1  Mar. 17, 2005

(30) Foreign Application Priority Data

Aug. 27, 2003  (TW) .............................. 92215475 U

(51) Int. Cl.
*E05D 11/10* (2006.01)
(52) U.S. Cl. ....................................................... 16/324
(58) Field of Classification Search ................. 16/235, 16/239, 242, 243, 250, 277, 284, 285, 324–326, 16/352, 362, 327; 403/111, 113, 119, 120; 379/433.11–13, 433, 428; 455/90, 550, 556, 455/575
See application file for complete search history.

(56) References Cited

U.S. PATENT DOCUMENTS

| 5,923,751 | A | * | 7/1999 | Ohtsuka et al. ......... 379/433.13 |
| 5,966,776 | A | * | 10/1999 | Ona ............................. 16/328 |
| 6,148,480 | A | * | 11/2000 | Cooke ......................... 16/303 |
| 6,256,481 | B1 | * | 7/2001 | Jeong et al. .............. 455/575.3 |
| 6,344,977 | B1 | * | 2/2002 | Takagi ........................ 361/814 |
| 6,438,228 | B1 | * | 8/2002 | Jeong et al. ........... 379/433.13 |
| 6,459,887 | B1 | | 10/2002 | Okuda |
| 6,775,883 | B1 | * | 8/2004 | Pan et al. ..................... 16/284 |
| 6,823,067 | B1 | * | 11/2004 | Kubota ................. 379/433.13 |

* cited by examiner

*Primary Examiner*—Robert J. Sandy
*Assistant Examiner*—Andre' L. Jackson
(74) *Attorney, Agent, or Firm*—Morris Manning & Martin; Tim Tingkang Xia, Esq.

(57) ABSTRACT

A hinge assembly includes a shaft (1), a prime mover spring (2) having two end portions (22, 23), a case drive member (3) having a cam face (311), a main body drive member (4) having a cam face (411) movably engaged with the cam face of the case drive member, a number of driving pins (5) each having one end abutting the case drive member, and a manual button (8) connected with an opposite end of each driving pin. The two end portions of the prime mover spring are respectively secured in a flange head (12) of the shaft and in the case drive member. The shaft extends through the prime mover spring, the case drive member and the main body drive member thereby integrating the hinge assembly into a complete unit.

18 Claims, 6 Drawing Sheets

HINGE ASSEMBLY WITH INTEGRATING SHAFT

BACKGROUND OF THE INVENTION

1. Field of the Invention

The present invention relates to hinge assemblies, and particularly to a hinge assembly for a foldable portable electronic device.

2. Description of Prior Art

With the development of the technologies of wireless communication and information processing, portable electronic devices such as mobile phones and PDAs (Personal Digital Assistants) are now in widespread use. These portable electronic devices enable consumers to enjoy the convenience of high technology services anytime and anywhere. Foldable mobile telephones are particularly favored by consumers for their comprehensive useful and amusing features.

Conventionally, a hinge assembly for a foldable portable device includes two barrel portions, which are provided respectively in a main body case and in a flip case of the foldable portable device. A central hinge pin movably fixes the barrel portions together. The flip case is thus rotatably connected to the main body case by the hinge assembly.

With the conventional hinge assembly as described above, two hands are generally needed to rotatingly open the flip case up from the main body case. One hand is used to hold the main body case, and the other hand rotates the flip case up. This can be inconvenient for a user who is busy doing other things at the same time.

U.S. Pat. No. 6,459,887 issued at Oct. 1, 2002 provides a hinge assembly to solve the above problem. As represented in FIG. 6, the hinge assembly relies on a manual button to open the flip case conveniently. There are two barrel portions 13', 22' respectively provided in a main body case 1' and in a flip case 2' of a foldable telephone, and the hinge assembly 4' is inserted through the barrel portions 13', 22'. The hinge assembly 4' has a manual button 41' protruding from the barrel portion 13'. The hinge assembly 4' is substantially in the form of a round rod, and includes a case drive member 43' and a main body drive member 44'. The case drive member 43' and the main body drive member 44' are each in the form of a hollow cylinder, are coaxially engaged with each other, and are axially movably relative to each other and rotatable relative to each other. Cam faces 6', 61' in slidable contact with each other are formed in mutually opposing positions of the case drive member 43' and the main body drive member 44'.

The case drive member 43' is provided with a pair of projections 48' on an outer periphery thereof. The projections 48' are circumferentially spaced apart, and are engaged in an inner periphery of the barrel portion 22' of the flip case 2', so that the case drive member 43' is rotatable with the flip case 2'. Further, the main body drive member 44' is provided with a pair of projections 47' on an outer periphery thereof. The projections 47' are circumferentially spaced apart and engaged in an inner periphery of the barrel portion 13' of the main body case 1', so that the main body drive member 44' is rotatable with the main body case 1'.

The hinge assembly 4' further includes a tubular member 42', a shank 45', a prime mover spring 5', and an auxiliary spring 51'. The tubular member 42' has a right end with the manual button 41' fixed thereto, and a left end extending through a flange 44b' of the main body drive member 44' and the auxiliary spring 51' and in slidable contact with the case drive member 43'.

The flip case 2' can be opened to a fully open position at the press of the manual button 41'. However, the shank 45' extends leftward from the left side face of the flange 44b', and a discoid flange 46' is provided at the left end of the shank 45'. The hinge assembly is not easy to manufacture and assemble.

In view of the above-described shortcomings, a new hinge assembly is desired. In particular, a hinge assembly providing convenient operation and easy manufacturing and assembly is desired.

SUMMARY OF THE INVENTION

An object of the present invention is to provide a hinge assembly which can be operated conveniently and which is relatively easy to manufacture and assemble.

A hinge assembly according to the present invention includes a shaft, a prime mover spring having two end portions, a case drive member having a cam face, a main body drive member having a cam face movably engaged with the cam face of the case drive member, a plurality of driving pins each having one end abutting the case drive member, and a manual button connected with an opposite end of each driving pin. The end portions of the prime mover spring are respectively secured in a flange head of the shaft and in the case drive member. The shaft extends through the prime mover spring, the case drive member and the main body drive member, thereby integrating the hinge assembly into a complete unit.

Other objects, advantages and novel features of the invention will become more apparent from the following detailed description when taken in conjunction with the accompanying drawings, in which:

DETAILED DESCRIPTION OF THE INVENTION

Figure 1:
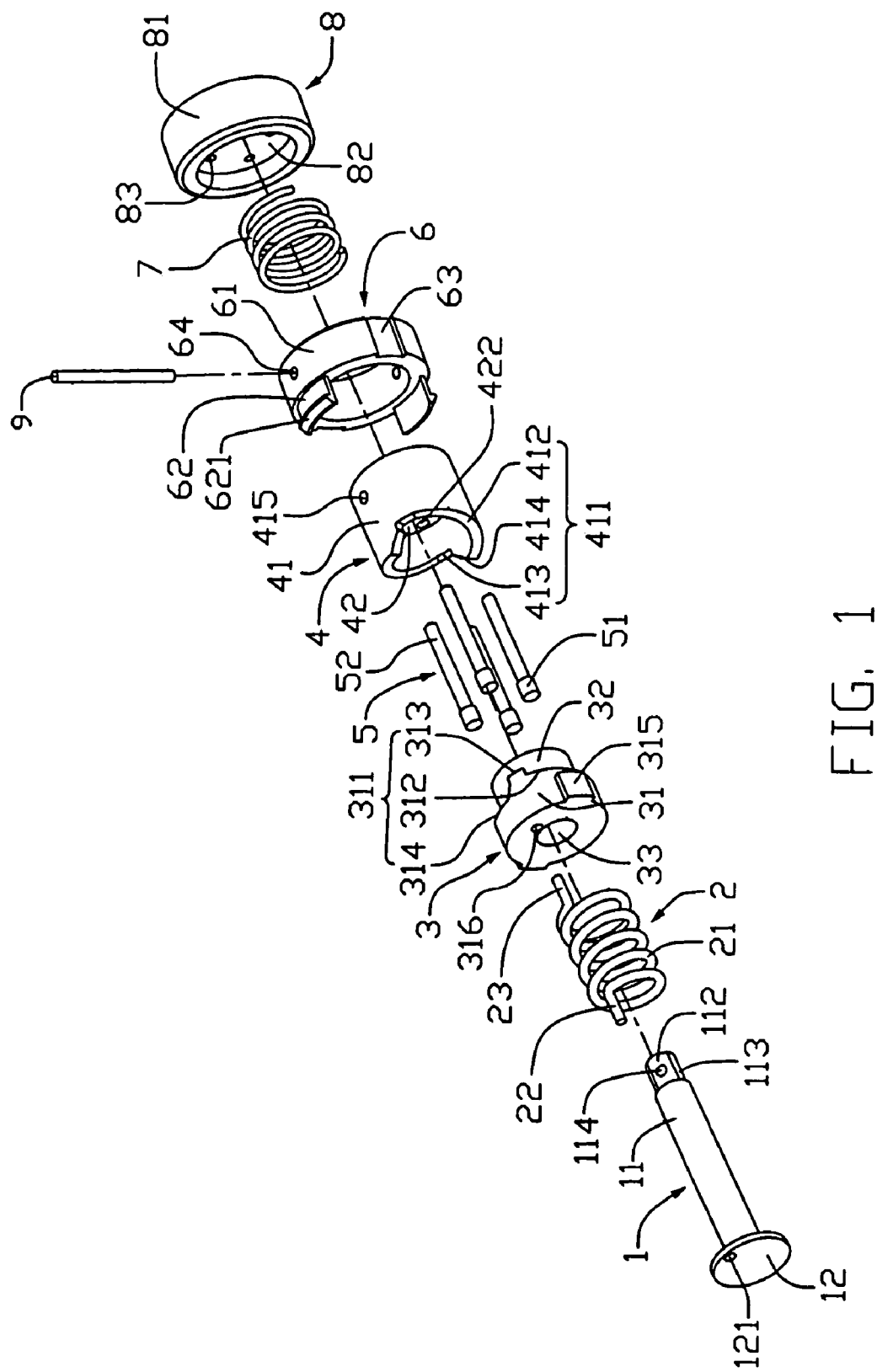
FIG. 1 is an exploded, isometric view of a hinge assembly according to the present invention, the hinge assembly including a case drive member and a main body drive member.
Figure 3:
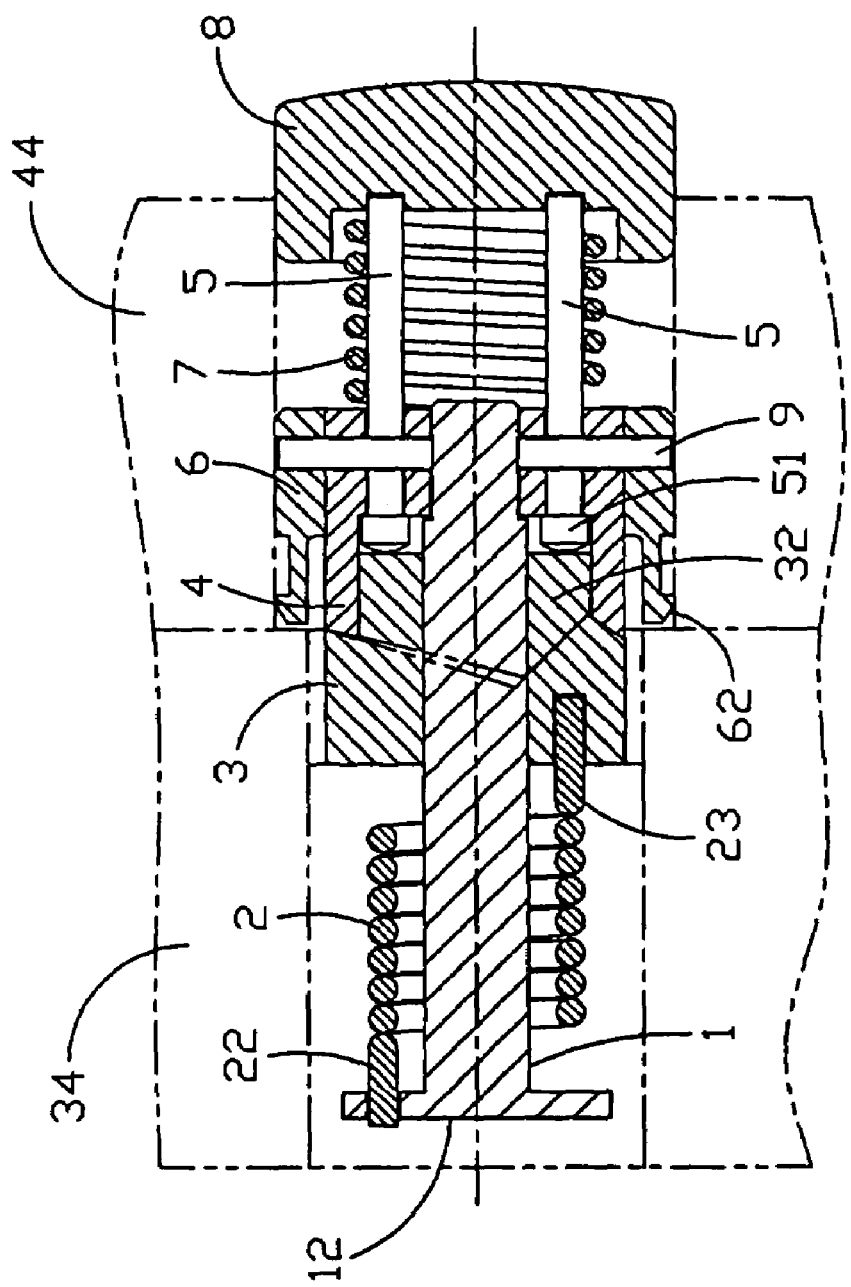
FIG. 3 is a cross-sectional view corresponding to line III—III of FIG. 2.

FIG. 3 shows a hinge assembly according to the present invention, together with a first barrel portion 34 of a flip case (not shown) of a foldable portable telephone, and a second barrel portion 44 of a main body case (not shown) of the foldable portable telephone. The hinge assembly is fixed in the two barrel portions 34, 44, and thus rotatably connects the flip case to the main body case. The hinge assembly has a manual button 8 adapted to protrude from the main body case. As shown in FIG. 1, the manual button 8 has a pillar body 81, a concavity 82 defined in a left end of the pillar body 81, and four holes 83 axially defined in a right end of the pillar body 81 and being in communication with the concavity 82.

Figure 2:
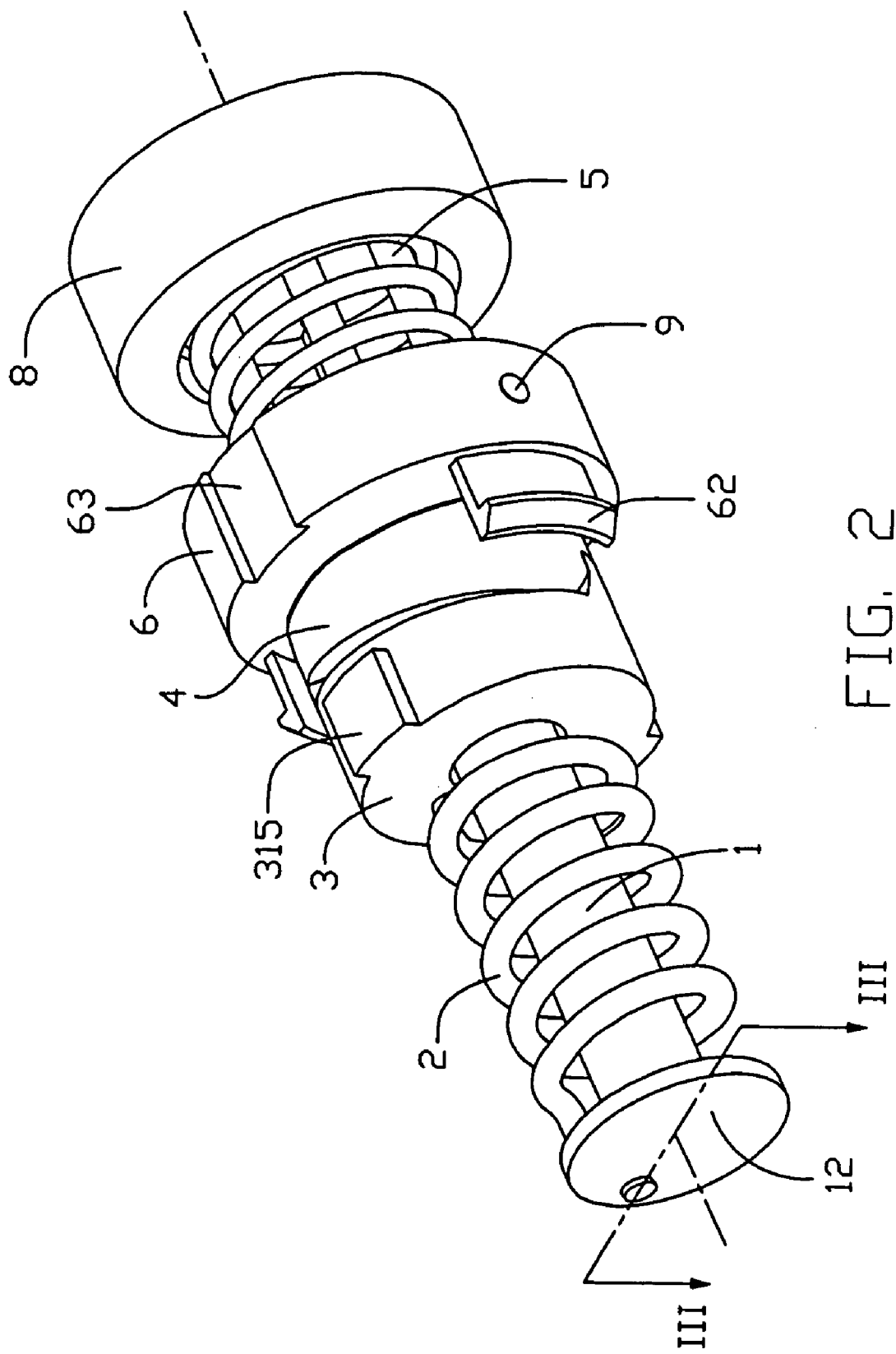
FIG. 2 is an enlarged, assembled view of the hinge assembly of FIG. 1.

As shown in FIG. 2, the hinge assembly is substantially in the form of a round rod. The hinge assembly includes a case drive member 3, a main body drive member 4 and a locating cylinder 6, which are each in the form of a hollow cylinder. The case drive member 3 and the main body drive member 4 are coaxially engaged with each other, and are axially movably relative to each other and rotatable relative to each other.

The case drive member 3 includes a first tubular portion 31 with a larger outer diameter, and a second tubular portion 32 with a smaller outer diameter. The two tubular portions 31, 32 are coaxially arranged and have a common cavity 33. The first tubular portion 31 has an outer cam face 311 where it adjoins the second tubular portion 32. The cam face 311 includes two slopes 312, 314 at opposite sides of a ridge 313. A pair of projections 315 is provided on an outer periphery of the first tubular portion 31, circumferentially spaced apart according to a predetermined angle. The projections 315 are engaged in an inner periphery of the first barrel portion 34 of the flip case, so that the case drive member 3 is rotatable with the flip case. A hole 316 is defined in a left end of the first tubular portion 31.

Figure 4:
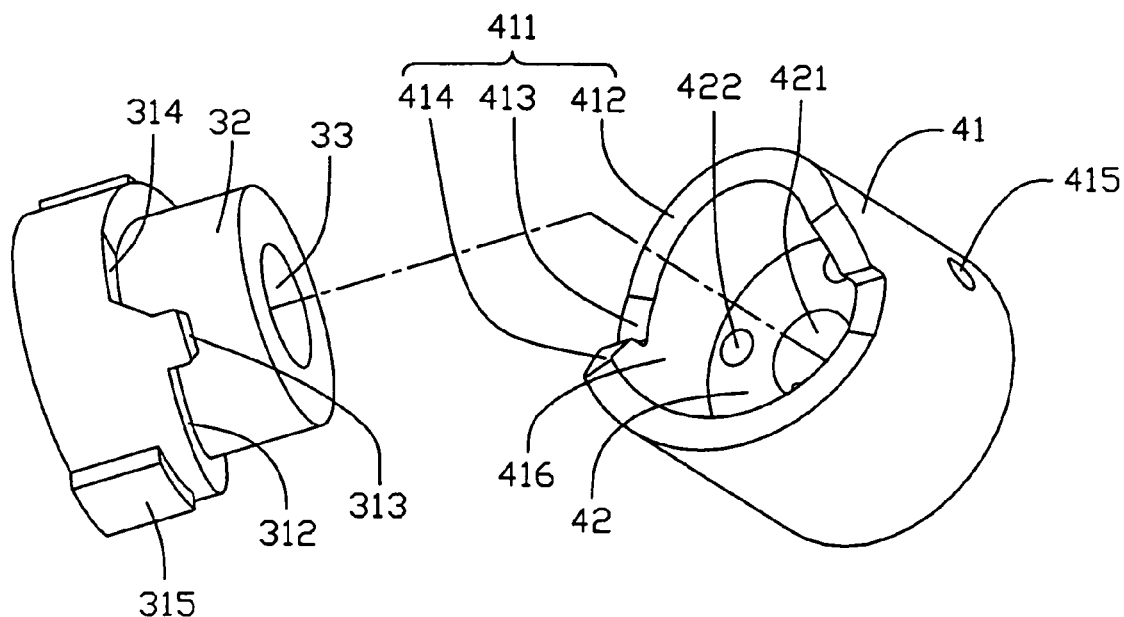
FIG. 4 is an exploded, isometric view of the case drive member and the main body drive member of FIG. 2.

The main body drive member 4 includes a third tubular portion 41 with a larger inner diameter and a fourth tubular portion 42 with a smaller inner diameter. The inner diameter of the third tubular portion 41 is substantially equal to the outer diameter of the second tubular portion 32 of the case drive member 3. Referring also to FIG. 4, the third tubular portion 41 defines a receiving hole 416 for receiving the second tubular portion 32. The fourth tubular portion 42 axially defines a cavity 421, which is coaxial and in communication with the receiving hole 416. A pair of aligned holes 415 is transversely defined through the fourth tubular portion 42. A left end of the third tubular portion 41 has a cam face 411, which slidably contacts the cam face 311 of the case drive member 3. The cam face 411 includes a slope 412 and a seat portion 413 at respective opposite sides of a ridge 414. Four spaced holes 422 are axially defined through the fourth tubular portion 42.

The locating cylinder 6 includes an annular body 61 receiving the main body drive member 4 therein. A pair of symmetrically opposite arcuate protrusions 62 extends from a left end of the body 61, and an arcuate projection 621 extends perpendicularly outwardly from a distal end of each protrusion 62. A pair of axial grooves 63 is defined in an outer peripheral wall of the body 61, circumferentially spaced apart according to a predetermined angle. The grooves 63 enable engagement of the locating cylinder 6 in an inner periphery of the second barrel portion 44 of the main body case, so that the locating cylinder 6 and hence the main body drive member 4 are rotatable with the main body case. A pair of aligned holes 64 is defined through opposite sides of the outer peripheral wall of the body 61, for alignment with the holes 415 of the main body drive member 4.

The hinge assembly further includes a shaft 1, a prime mover spring 2, four driving pins 5, an auxiliary spring 7, and a positioning pin 9.

The shaft 1 comprises a pole portion 11, and a flange head 12 at a left end of the pole portion 11. A hole 121 is defined in the flange head 12. A right end of the pole portion 11 has a keyed cross-section, and two opposite parallel planes 112 and two opposite arcuate faces 113. A common diameter of the arcuate faces 113 is less than a diameter of the main part of the pole portion 11. A hole 114 is transversely defined through the right end of the pole portion 11 between the parallel planes 112. The positioning pin 9 is engaged in the holes 64 of the locating cylinder 6, the holes 415 of the main body drive member 4, and the hole 114 of the shaft 1.

The prime mover spring 2 has a helical body 21, and two end portions 22, 23 extending from respective opposite ends of the body 21. Each driving pin 5 has a body 52 and an enlarged head 51. The body 52 is received through a corresponding hole 422 of the fourth tubular portion 42 of the main body drive member 4, and is secured in a corresponding hole 83 of the manual button 8. The head 51 abuts a right end face of the second tubular portion 32 of the case drive member 3. The auxiliary spring 7 is disposed around the four driving pins 5. One end of the auxiliary spring 7 abuts a right end face of the fourth tubular portion 42 of the main body drive member 4, and an opposite end of the auxiliary spring 7 abuts an internal end wall of the pillar body 81 of the manual button 8. In a normal state, the auxiliary spring 7 biases the manual button 8 so that the manual button 8 protrudes from the main body case.

In assembly of the hinge assembly, the shaft 1 is passed through the prime mover spring 2, the cavity 33 of the case drive member 3 and the cavity 421 of the main body drive member 4. The end portion 22 of the prime mover spring 2 is secured in the hole 121 of the flange head 12 of the shaft 1, and the end portion 23 of the prime mover spring 2 is secured in the hole 316 of the first tubular portion 31 of case drive member 3, with the main body drive member 4 being secured in the locating cylinder 6. The positioning pin 9 is secured in the holes 64 of the locating cylinder 6, the holes 415 of the main body drive member 4 and the hole 114 of the shaft 1. The auxiliary spring 7 is disposed around the four driving pins 5, with the heads 51 of the driving pins 5 abutting the right end face of the second tubular portion 32 of the case drive member 3, and the bodies 52 of the driving pins 5 being secured in the holes 83 of the manual button 8. The hinge assembly is thus completely assembled.

Figure 5A:
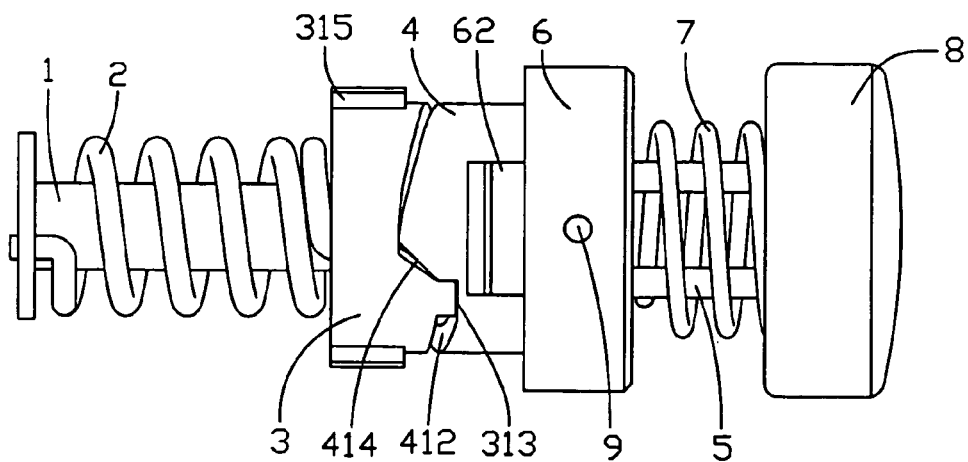
FIGS. 5(a)–5(c) are side elevations of the hinge assembly of FIG. 2, illustrating sequential stages of operation of the hinge assembly.
Figure 5B:
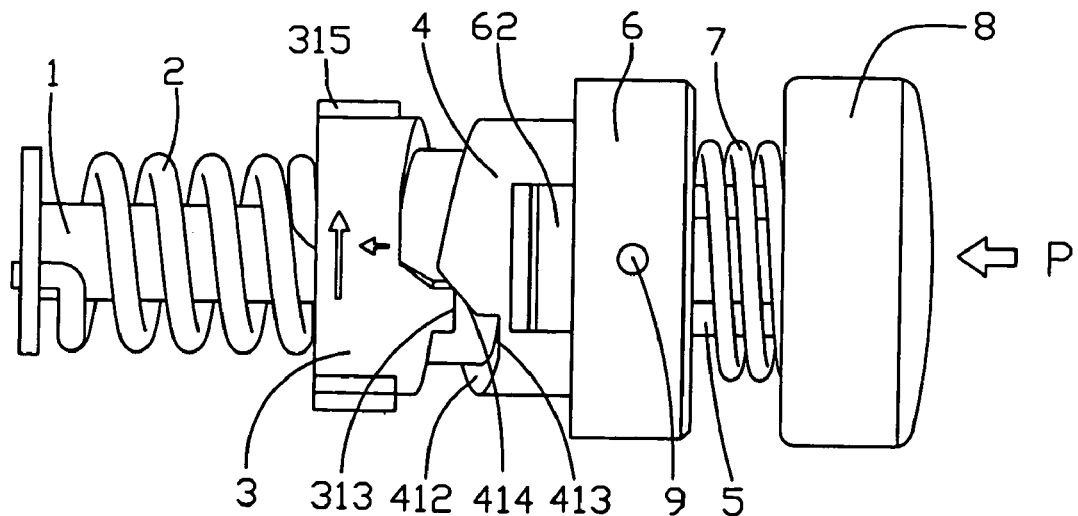
Figure 5C:
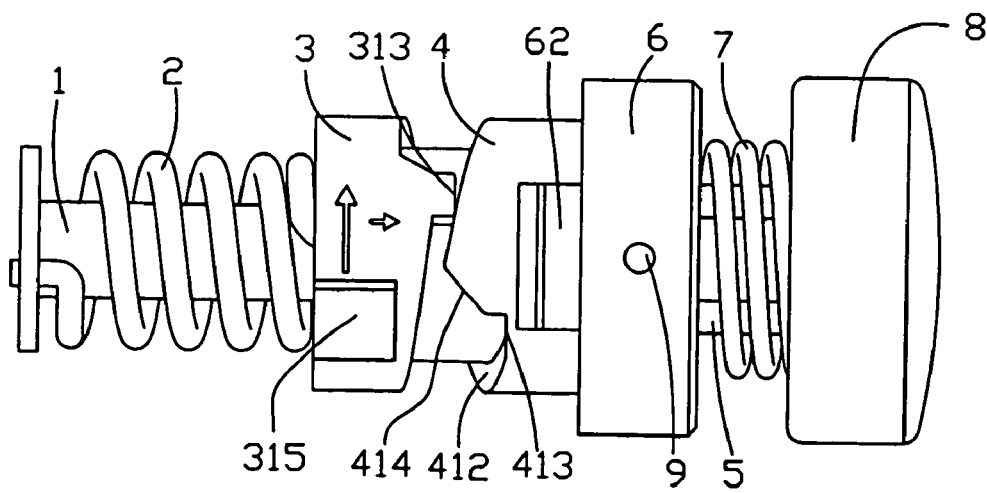
Figure 6:
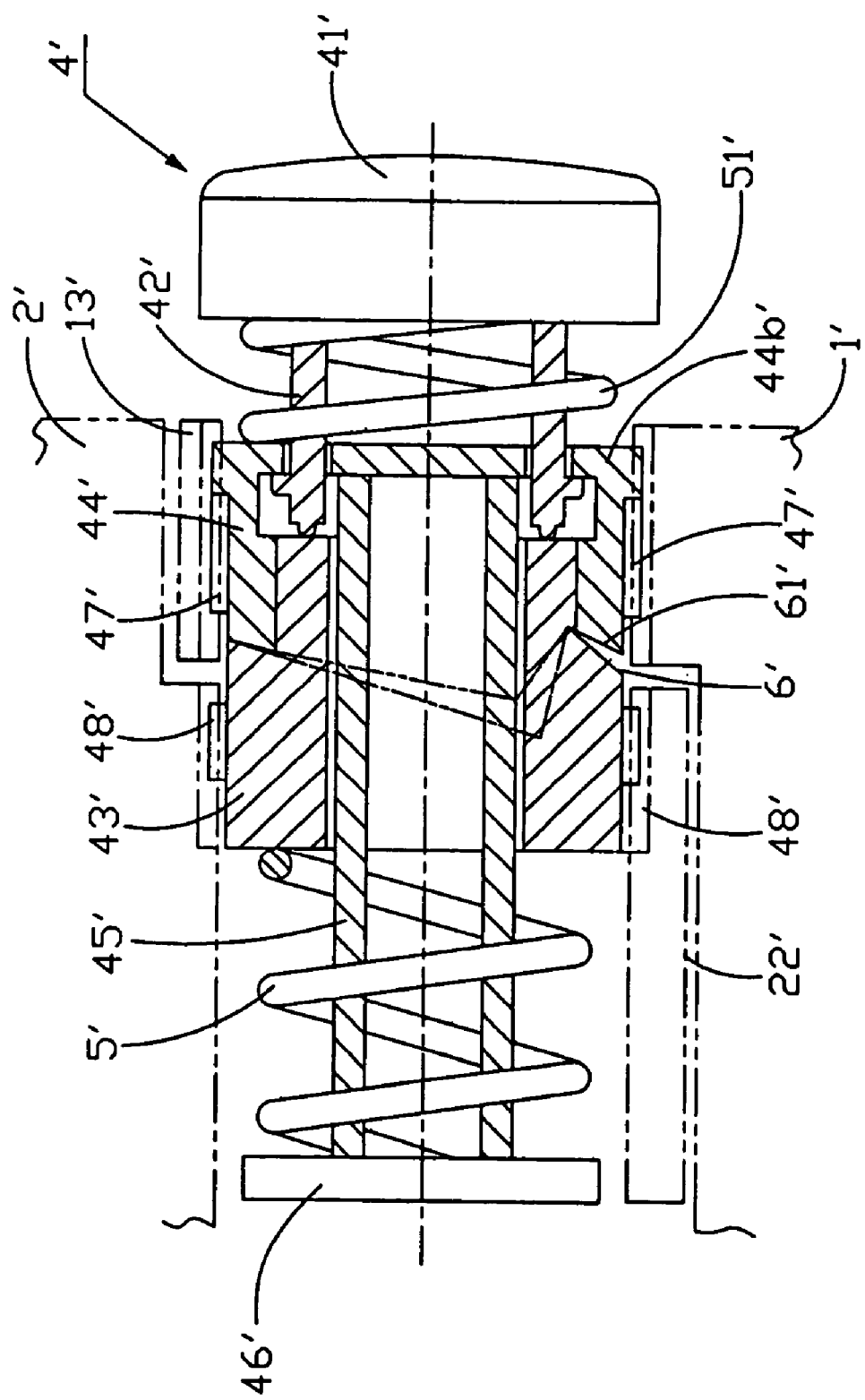
FIG. 6 is a partly cut away side elevation of a conventional hinge assembly.

When the flip case of the foldable portable telephone is held in a fully closed position, the cam face 311 of the case drive member 3 and the cam face 411 of the main body drive member 4 are in close interengagement with each other, as seen in FIG. 5(*a*). That is, the ridge 313 of the cam face 311 is engaged with the seat portion 413 of the cam face 411. The prime mover spring 2 exerts an axial elastic biasing force, and a rotational elastic biasing force in a direction of opening of the flip case. The former force is predominant, so that the cam face 311 is held in engagement with the cam face 411. Thus the case drive member 3 cannot rotate, and the flip case is held in the closed position. If the ridge 313 of the cam face 311 is in contact with the slope 412 of the cam face 411 adjacent the seat portion 413, the case drive member 3 is subjected to the rotational biasing force in the opening direction, and to the axial biasing force of the prime mover spring 2. Because of the forces and the orientation of the slope 412 of the cam face 411, the ridge 313 is driven into engagement with the seat portion 413, and the flip case is properly held in the closed position in contact with the main body case.

When the manual button 8 is pressed by a user against the forces of the prime mover spring 2 and the auxiliary spring 7 in order to open the flip case, as shown in FIG. 5(*b*), pressure P is delivered to the case drive member 3. The case drive member 3 is thereby axially moved away from the main body drive member 4, and is biased to rotate in the opening direction by the rotational biasing force of the prime mover spring 2. As a result, the ridge 313 of the cam face 311 rides over an apex of the ridge 414 of the cam face 411. The pressure P on the manual button 8 is released, and the case drive member 3 is subjected to a torque acting in the opening direction by reason of the axial biasing force of the prime mover spring 2 and the orientation of the slope 412 of the cam face 411, as shown in FIG. 5(*c*). The torque drives the case drive member 3 to thus rotate, so that the flip case is opened to a fully open position.

When the flip case is to be closed, the flip case is manually rotated in a direction of closing of the flip case against the rotational biasing force of the prime mover spring 2. The ridge 313 of the cam face 311 ascends the slope 412 of the cam face 411, and rides over the apex of the ridge 414 of the cam face 411. Thereupon the case drive member 3 is subjected to a torque acting in the closing direction by reason of the axial biasing force of the prime mover spring 2 and the orientation of the ridge 414. The torque drives the case drive member 3 to thus rotate even if the user releases his/her pressure on the flip case. The flip case is accordingly closed to the closed position.

In the hinge assembly of the present invention, the shaft 1 extends through the prime mover spring 2, the case drive member 3 and the main body drive member 4 thereby integrating the hinge assembly into a complete unit. In addition, the flip case can be opened from the closed position to the open position merely by momentarily pressing the manual button 8. This can be done by a user holding the main body case in the palm of one hand, and pressing the manual button 8 with the thumb of the same hand. That is, only one hand is needed, which is most convenient. Furthermore, if desired, the flip case can be opened from the closed position by directly grasping it, without the need for pressing the manual button 8.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. A hinge assembly for a foldable portable electronic device, comprising:
   a shaft;
   a case drive member;
   a prime mover spring having two end portions, the end portions being respectively secured to the shaft and the case drive member;
   a main body drive member movably engaged with the case drive member;
   a locating cylinder for receiving the main body drive member therein, the locating cylinder comprising an annular body, at least one hole through an outer periphery of the annular body, at least one protrusion extending from one end of the annular body, and a projection extending at an angle from a distal end of said at least one protrusion;
   at least one driving pin having one end abutting the case drive member;
   a manual button adapted to retain an opposite end of said driving pin; and
   a positioning pin for holding the shaft and the main body drive member;
   wherein the shaft extends through the prime mover spring, the case drive member and the main body drive member thereby integrating the hinge assembly into a complete unit.

2. A hinge assembly for a foldable portable electronic device, comprising:
   a shaft, the shaft comprising a pole portion, wherein one end of the pole portion has a keyed cross-section and two opposite parallel planes and two opposite arcuate faces, and said end of the pole portion transversely defines a hole therethrough between the parallel planes;
   a case drive member;
   a prime mover spring having two end portions, the end portions being respectively secured to the shaft and the case drive member;
   a main body drive member movably engaged with the case drive member;
   a locating cylinder for receiving the main body drive member therein, the locating cylinder comprising an annular body and defining at least one hole throat an outer periphery of the annular body;
   at least one diving pin having one end abutting the case drive member;
   a manual button adapted to retain an opposite end of said driving gin; and
   a positioning pin for holding the shaft and the main body drive member;
   wherein the shaft extends through the prime mover spring, the case drive member and the main body drive member thereby integrating the hinge assembly into a complete unit.

3. The hinge assembly as claimed in claim 2, wherein the case drive member comprises a first tubular portion with a larger outer diameter and a second tubular portion with a smaller outer diameter, and the first and second tubular portions are coaxially arranged and have a common cavity.

4. The hinge assembly as claimed in claim 3, wherein the main body drive member comprises a third tubular portion with a larger inner diameter and a fourth tubular portion with a smaller inner diameter, the inner diameter of the third tubular portion is substantially equal to the outer diameter of the second tubular portion of the case drive member, and the third tubular portion defines a receiving hole movably receiving the second tubular portion.

5. The hinge assembly as claimed in claim 4, wherein the fourth tubular portion of the main body drive member axially defines a cavity, the prime mover spring has a helical body and the two end portions extending from respective opposite ends of the helical body, and the shaft extends through the helical body of the prime mover spring, the cavity of the case drive member, and the cavity of the main body drive member.

6. The hinge assembly as claimed in claim 5, wherein the main body drive member defines at least one hole therethrough, and the positioning pin is engaged in said hole of the locating cylinder, said hole of the main body drive member, and the hole of the shaft.

7. The hinge assembly as claimed in claim 6, wherein the manual button comprises a pillar body, a concavity defined in one end of the pillar body, and at least one hole axially defined in the pillar body and being in communication with the concavity.

8. The hinge assembly as claimed in claim 7, wherein the fourth tubular portion of the main body drive member axially defines at least one hole therethrough, said driving pin has a body and an enlarged head, and the body of said driving pin is received through said hole of the fourth tubular portion of the main body drive member and secured in said hole of the manual button, with the head abutting the second tubular portion of the case drive member.

9. The hinge assembly as claimed in claim 8, further comprising a resilient member, wherein one end of the resilient member abuts the main body drive member, an opposite end of the resilient member abuts the pillar body of the manual button, and the resilient member is disposed around said driving pin.

10. The hinge assembly as claimed in claim 9, wherein a flange head is provided at an opposite end of the pole portion of the shaft, and the flange head defines a hole therein.

11. The hinge assembly as claimed in claim 10, wherein the first tubular portion of the case drive member defines a hole in one end thereof, one of the end portions of the prime mover spring is secured in the hole of the flange head of the shaft, and the other end portion of the prime mover spring is secured in the hole of the first tubular portion of the case drive member.

12. The hinge assembly as claimed in claim 4, wherein the first tubular portion of the case drive member has an outer cam face where it adjoins the second tubular portion, and the cam face includes two slopes at opposite sides of a ridge.

13. The hinge assembly as claimed in claim 12, wherein one end of the third tubular portion of the main body drive member has a cam face slidably contacting the cam face of the case drive member, and the cam face of the main body drive member comprises a slope and a seat portion at opposite sides of a ridge.

14. A foldable portable telephone comprising:
a flip case provided with a first barrel portion;
a main body case provided with a second barrel portion; and
a hinge assembly fixed in the two barrel portions thereby rotatably connecting the flip case to the main body case, the hinge assembly comprising:
a shaft;
a prime mover spring having two end portions;
a case drive member with a cam face, the cam face having two slopes at opposite sides of a ridge;
a main body drive member coaxially arranged with the case drive member, and having a cam face engaged with the cam face of the case drive member, the cam face having a slope and a seat portion at respective opposite sides of a ridge;
a locating cylinder for receiving the main body drive member therein;
at least one driving pin having one end abutting the case drive member; and
a manual button adapted to retain an opposite end of said driving pin;
wherein the shaft extends through the prime mover spring, the case drive member and the main body drive member thereby integrating the hinge assembly into a complete unit, with the two end portions of the prime mover spring being respectively secured to the shall and the case drive member.

15. The foldable portable telephone as claimed in claim 14, wherein the locating cylinder defines at least one groove in an outer peripheral wall thereof, and the at least one groove enables engagement of the locating cylinder in an inner periphery of the second barrel portion of the main body case.

16. The foldable portable telephone as claimed in claim 14, wherein at least one projection is provided on an outer periphery of the case drive member, and the at least one projection is engaged in an inner periphery of the first barrel portion of the flip case.

17. The foldable portable telephone as claimed in claim 14, wherein the shaft transversely defines a hole in one end thereof, the main body drive member transversely defines at least one hole for alignment with the hole of the shaft, and a positioning pin is engaged in said hole of the main body drive member and the hole of the shaft.

18. The foldable portable telephone as claimed in claim 17, wherein the locating cylinder defines at least one hole through an outer periphery thereof, and the positioning pin is engaged in the hole of the locating cylinder, the hole of the main body drive member, and the hole of the shaft.

* * * * *